United States Patent [19]

Schnellmann et al.

[11] 3,754,357

[45] Aug. 28, 1973

[54] METHOD FOR PERFORMING SUCCESSIVE GRINDING OPERATIONS ON A WORKPIECE

[75] Inventors: Oscar Schnellmann, Zurich, Switzerland; Henry Willy Stier, Dearborn Heights, Mich.

[73] Assignee: Carmet Company, Pittsburgh, Pa.

[22] Filed: Apr. 28, 1971

[21] Appl. No.: 138,222

Related U.S. Application Data

[62] Division of Ser. No. 751,879, Aug. 12, 1968, Pat. No. 3,587,192.

[52] U.S. Cl. ............................... 51/323, 51/327
[51] Int. Cl. .......................... B24b 1/00, B24b 21/16
[58] Field of Search ................. 51/281 R, 326, 327, 51/323, 215 R, 215 AR, 215 HM, 215 H, 216 ND, 216 H, 118, 236, 127

[56] References Cited
UNITED STATES PATENTS

| | | | |
|---|---|---|---|
| 1,396,130 | 11/1921 | Lake | 51/215 HM X |
| 1,923,931 | 8/1933 | Jones | 51/118 |
| 3,434,248 | 3/1969 | Martin | 51/236 X |
| 2,871,627 | 2/1959 | Bringelson | 51/127 |
| 2,324,953 | 7/1943 | Reed | 51/216 H X |

*Primary Examiner*—Donald G. Kelly
*Attorney*—Vincent G. Giola et al.

[57] ABSTRACT

A method of performing successive grinding operations on a given workpiece by automatic profile grinding machine with indexing mechanism especially for contour grinding of relatively small parts such as tool inserts, comprised of a grinding wheel, work stations arranged around said grinding wheel, universal work feeding mechanism associated with each work station, individual cam mechanisms for each work station to index the grinding steps, electric and fluid pressure control mechanisms to control operation of the machine, work measuring mechanism and adjusting mechanism associated with the measuring mechanism to compensate for wear or out of balance condition of the grinding wheel.

5 Claims, 24 Drawing Figures

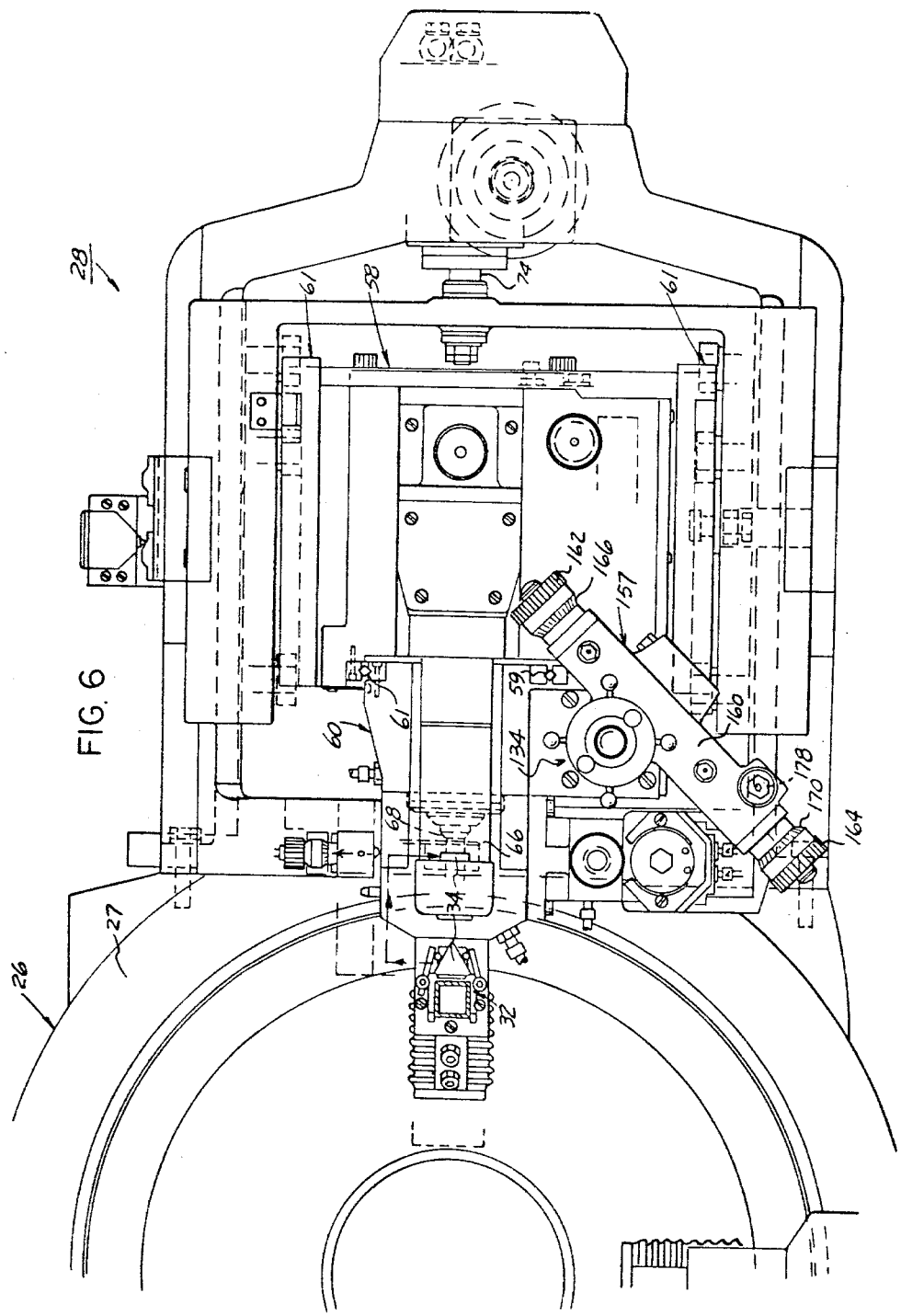

Patented Aug. 28, 1973 3,754,357

| | | ↓ VALVES | | |
|---|---|---|---|---|
| INFEED | A1 | | | |
| | A2 | CLOSED | | |
| | B1 | | VENT | MVA2 |
| | B2 | CLOSED | | MVA1 |
| WORK TRANSFER | A4 | CLOSED | | MVE1 |
| | A5 | OPEN | | |
| | A6 | IN | | MVE3 |
| | A7 | OUT | | |
| | A8 | TOP | | MVE2 |
| | A9 | BOTTOM | | |
| | A10 | CLOSED | | MVC2 |
| | A12 | REV | | |
| | A13 | | | MVC1 COMPENSATION |
| GAGING | A14 | UP | | MVD1 |
| | A15 | DOWN | | |
| | A17 | REV. | | MVD2 |
| | A18 | GAGING | | |
| SPINDLE | B4 | FORW. | | |
| | B5 | ⊗ | | MVB2 |
| | B6 | REV. | | |
| | B8 | DOWN | | MVB1 |
| | B9 | UP | | |
| | B11 | | | |
| | C16 | COUNTER | | |
| | D1 | ⊗ GRIND OPER. | | |
| M2 | D4 | INTERM IMPULSE | | |
| | D5 | ⊗ | | |
| | D6 | CONTINUOUS | | |
| M2 | D7 | INTERM IMPULSE | | |
| | D9 | ⊗ ON/OFF | | |
| | E11 | TIMER OSCILL. MOTOR | | |
| | F1 | | EMERG STOP | |
| | F4 | | AUTOMAT IN | |
| | F5 | SELECTOR SWITCH/AUTOMAT SET UP | | |
| | F6 | SELECTOR SWITCH PROGRAM I OR II | | |
| OSCILL. | F7 | INTERM IMPULSE | | |
| | F8 | ⊗ | | |
| | F9 | OPERATION ON/OFF | | |
| | F11 | COUNTER TOTAL | | |
| | | M1 | OSCILL MOTOR | |
| | | M2 | WORK SPINDLE MOTOR | |
| | | M3 | GRIND WHEEL MOTOR | |
| | | M4 | HYDR. MOTOR | |
| | | M5 | COOLANT MOTOR | |
| | | M6 | TURBO MOTOR | |
| MICRO SWITCHES | MC1 | INFEED | N+E | |
| | MC2 | PART CYCLE | | |
| | MC3 | MAX. CONDENSATION | | |
| | MC4 | AUTO. MAGAZINE | | |
| | MC5 | MAGAZINE EMPTY | | |
| FLOW REGULATORS | DR1 | MVA1 | K1 | |
| | DR2 | MVA2 | | |
| | DR3 | MVB2 | K3 | |
| | DR4 | MVB1 | K2 | |
| | DR5 | MVC2 | K4 | |
| | DR6 | MVC1 | K5 | |
| | DR7 | MVD1 | K6 | GAGING |
| | DR8 | MVD2 | K7 | |
| | DR9 | MVE1 | K10 | |
| | DR10 | MVE3 | K8 | AUTO. MAGAZINE |
| | DR11 | MVE2 | K9 | |

FIG. 18

METHOD FOR PERFORMING SUCCESSIVE GRINDING OPERATIONS ON A WORKPIECE

This application is a division of copending application Ser. No. 751,879 filed Aug. 12, 1968, now U.S. Pat. No. 3,587,192, issued June 28, 1971.

BACKGROUND OF THE INVENTION

1. Field of the Invention

The instant invention deals with a method of performing successive grinding operations in general and, in particular, to a method utilizing automatic multi-spindle profile or edge grinder for relatively small parts such as cutting tool inserts. Inserts for cutting tools, as is known, are relatively small plate-like members of polygonal shape which may be molded, forged or cut from a rod having a corresponding polygonal shape. They are usually made from hard sintered metals such as carbide, tungsten or the like. The unfinished blanks of the inserts must be provided with cutting edges along some or all of their sides. This is usually done by grinding. In order to avoid the laborous grinding by hand as had been the previous practice, machines have been developed for this purpose and lately fully automatic machines have been introduced. Due to the smallness of the parts to be worked on, intricate work handling mechanisms and control mechanisms had to be devised to make these machines more efficient and the present invention is concerned with improvements in the control and work handling mechanism of such machines.

2. Description of the Prior Art

In the prior art, machines are known which are entirely automatically controlled and provide work piece handling means to rotate the pieces for grinding the different sides and edges thereof. These machines usually comprise a grinding wheel and one or more grinding stations positioned around the wheel. The grinding stations are provided with work gripping and handling means to reposition the workpieces in relation to the grinding wheel to consecutively present the various sides of the workpieces to the grinding surface to form the cutting edges. However, these machines were not adapted for programmed or indexed operations and usually a change-over from one setup to the next setup required considerable time and labor since the pattern or matrixes had to be changed as well as the work gripping and work handling tools. If, for instance, it would be desirable to grind positive angles on certain workpieces and negative angles on other workpieces, it was not possible to perform these two or any other number of different operations on the same machine even where a number of individual work stations were provided. This is because of the difficulties hitherto encountered to precisely program and index the machine mechanism for complete automatic operation.

Grinding machines for cutting tool bits are known in the prior art which incorporate cam indexing mechanisms for repositioning of the polygonal workpiece between grinding steps to successively grind the rake angles and the radii of the workpiece. However, these known machines do not lend themselves for mass production since they normally comprise only one grinding station. Usually a small vertically and angularly adjustable grinding wheel is employed to cooperate with movable work handling means and a blank feeding magazine. For grinding workpieces of different polygonal shapes such as triangular, square, pentagonal or the like, or for grinding workpieces of identical polygonal shape of different sizes the indexing cam mechanism, work handling mechanism and feed magazines must be exchanged requiring considerable down time and labor expense.

SUMMARY OF THE INVENTION

The present invention relates to a fully automatic, multiple spindle profile grinder for contour grinding of indexable cutting tool inserts or the like, whereby several self-contained grinding units are arranged around a horizontally positioned grinding wheel. Manual attendance of the machine is limited to starting and stopping of the machine and to filling of the magazine with unground insert blanks.

For this purpose, the present automatic grinder had been equipped with a vertically arranged grinding spindle which drives a grinding wheel of sufficiently large dimension in horizontal position. Coolant is pumped through the spindle and a distribution system of jets located above the grinding wheel assures efficient cooling of the grinding zone. Several self contained grinding units are mounted radially around the grinding wheel. Grinding of the cutting tool inserts, that is, their sides and radii, including positive and/or negative rake angles, is accomplished in one cycle with a combination of programming systems, whereby the contour control is achieved by means of a master cam or template having a one to four or one to five ratio in relation to the insert. The automatic grinding cycle can be programmed for either a plunge grinding operation or a rotary grinding operation, or a combination of both, whereby the indexing cycle needs to be used during the plunge grinding operation only. The fully automatic individual grinding units are fluid pressure controlled and can be adjusted in position relative to the grinding wheel for grinding positive or negative rake angles on the insert. During the finishing cycle and during spark-out, an additional automatically controlled oscillating movement is imparted to the work linear to the grinding face to insure an optimum in surface finish on the cutting edges of the cutting tool inserts. An automatic measuring device gages the ground sides of the inserts and actuates a compensator to compensate for grinding wheel wear to insure maximum dimensional consistency. The positioning of the unground insert blanks as they come from the universal magazine, of which there is one for each work station, is accomplished by an automatic work clamping fixture. The transfer and repositioning of the finished ground cutting tool insert is likewise automatic, so that manual handling of the work is limited to the loading of the magazine. The magazines are universally adjustable to different shapes and sizes of insert blanks of polygonal form so that the change-over from one polybonal shape to another can be made quickly and without effort. The master cam, of course, would then have to be interchanged, too, in correspondence with the polygonal shape of the insert blank.

The movements of the grinding units or work stations are electric and fluid pressure controlled and can be coordinated with grinding and production conditions through a central control panel, which is separate for each unit. Through this direct and separate programming of each grinding unit, each unit can be set-up for a given shape and size insert, so that the machine can grind simultaneously as many different or identical profiles of inserts as there are grinding units positioned around the grinding wheel. The number of grinding units is only limited by the outer diameter of the grinding wheel and the necessary space required for the grinding units themselves. The machine as described herein, for example, has four complete units.

The application of indexable cutting tool inserts in the metal removing industry has been growing steadily. The grinding of the cutting edges on these indexable inserts is conventionally done on surface grinders, whereby the corner radii of the inserts have to be ground in a second operation with a form wheel or have to generated with a radius attachment. There have been some attempts made to combine the two operations on special grinding machines, but these have only had one work spindle.

In these machines the ratio of the master cam in relation to the workpiece has been usually one to one, which made it difficult to hold the necessary tolerances. In addition, measuring of the finished dimension of the inserts has to be done after removal of the finished workpiece from the machine. Thus, economical and rational grinding of indexable cutting tool inserts to accurate close tolerances was not possible.

The present novel design of a fully automatic multi-spindle profile grinder for indexable cutting tool inserts as described hereafter makes it possible to econimically mass-produce indexable cutting tool inserts to accurate close dimensional tolerances.

In addition, the universal master cam for each polygonal profile in combination with an automatic control mechanism allows the grinding of different corner radii and of cutting tool inserts having varied inscribed circle sizes without having to change the master cam. Thereby, the number of different master cams otherwise necessary for the great variety of insert shapes is greatly reduced. The separate grinding units are individually programmed and controlled automatically and selections can be made for the best possible working method, that is, for rotary grinding with infeed, for plunge grinding, or for a combination of both.

Further advantages and novel features will be apparent by the following detailed description in connection with the appended drawings illustrating a preferred embodiment of the present novel multi-spindle profile grinder.

BRIEF DESCRIPTION OF THE DRAWINGS

FIG. 6 is a top plan view of one of the grinding units;

FIG. 18 is a schematic diagram of the various groups of controls and their function.

DETAILED DESCRIPTION OF PREFERRED EMBODIMENT

Figure 1:
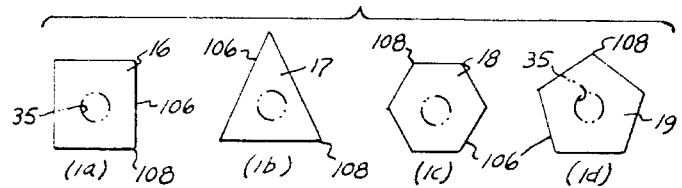
FIG. 1 shows four examples, 1a to 1d, of indexable cutting tool inserts of different polygonal shapes.

The present novel automatic multi-spindle profile grinder shown in the drawings is adapted for the fully automatic contour grinding of the cutting edges of cutting tool inserts such as shown in FIGS. 1a to 1d in which FIG. 1a illustrates a square shaped cutting tool insert 16. FIG. 1b illustrates a triangular shaped insert 17. FIG. 1c illustrates a hexagonal shape 18 and FIG. 1d illustrates a pentagonal shape 19. Although these are the most common shapes for cutting tool inserts, other polygonal shapes are known for special applications which can likewise be accommodated by the present novel grinder.

The present novel grinder can, besides grinding the sides, also produce the radii required at the apexes during the same work cycle.

Figure 2:
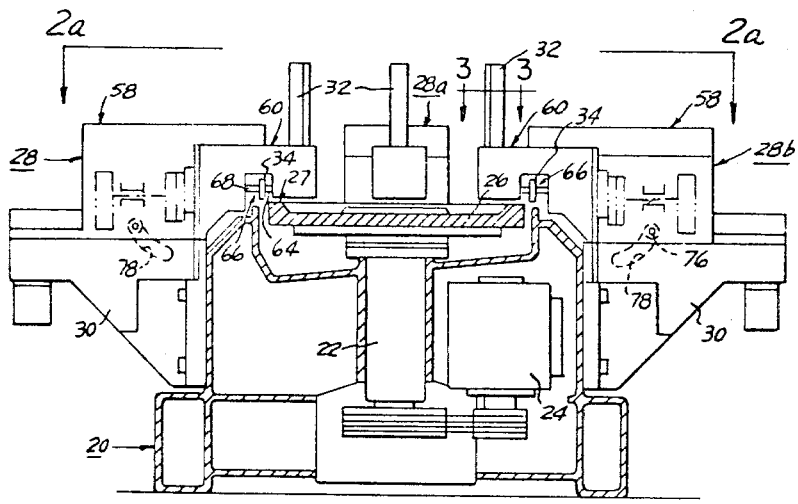
FIG. 2 is a schematic overall illustration of the present novel profile grinder with attached grinding units shown partly in cross section.
Figure 2A:
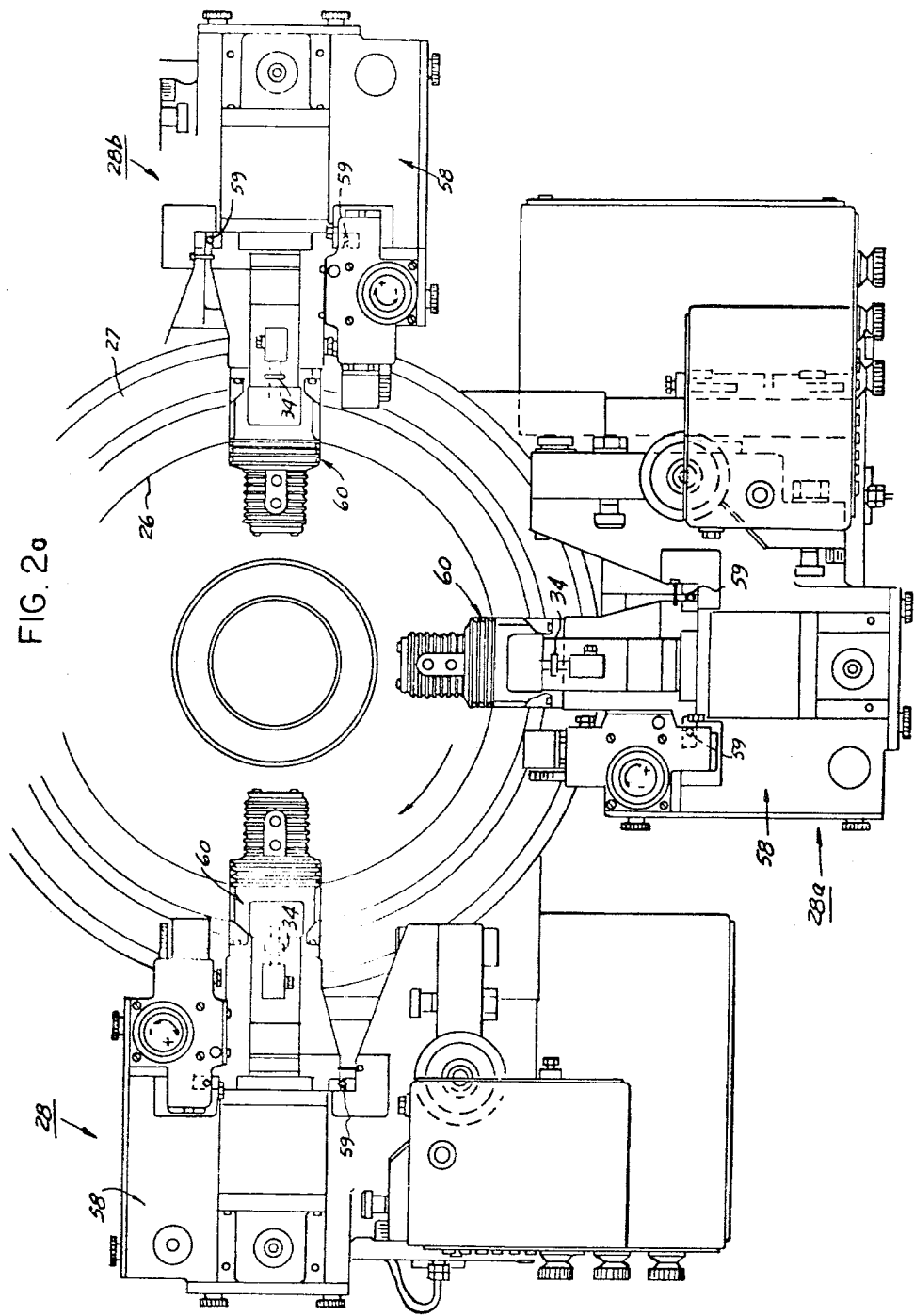
FIG. 2a is a partial plan view of the machine in FIG. 2.
Figure 10:
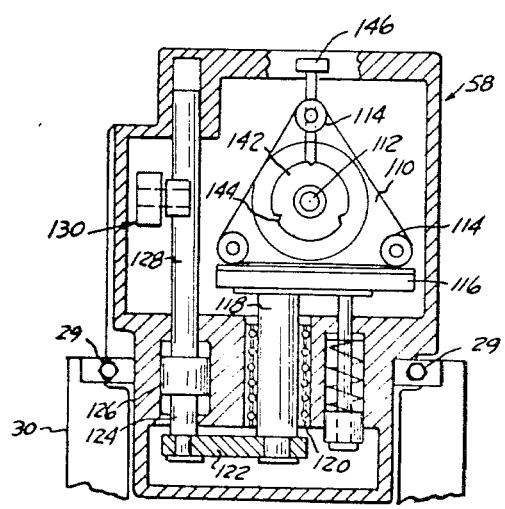
FIG. 10 is a section through FIG. 4 along line 10—10 schematically illustrating the master cam mechanism in more detail not necessarily drawn to scale.

With reference to FIG. 2 the machine comprises in general a machine base 20 which supports a vertically arranged grinding spindle 22 having a driving motor 24. Mounted on the upper end of the grinding spindle 22 is a grinding wheel 26 which may have an abrasive grinding surface 27 of any known composition adaptable for grinding of the relatively hard cutting tool inserts which may be made of sintered metals, carbides, tungsten or the like. The grinding units of work stations (three of which are shown in FIGS. 2 and 2a), 28, 28a and 28b are mounted on brackets 30 which are horizontally movable relatively to the machine base by means of slides 29 as seen in FIG. 10. A universal magazine 32 is mounted adjacent each of the grinding units 28 for automatic transport of cutting tool insert blanks 34 to the grinding area 66.

Figures 3, 3A:
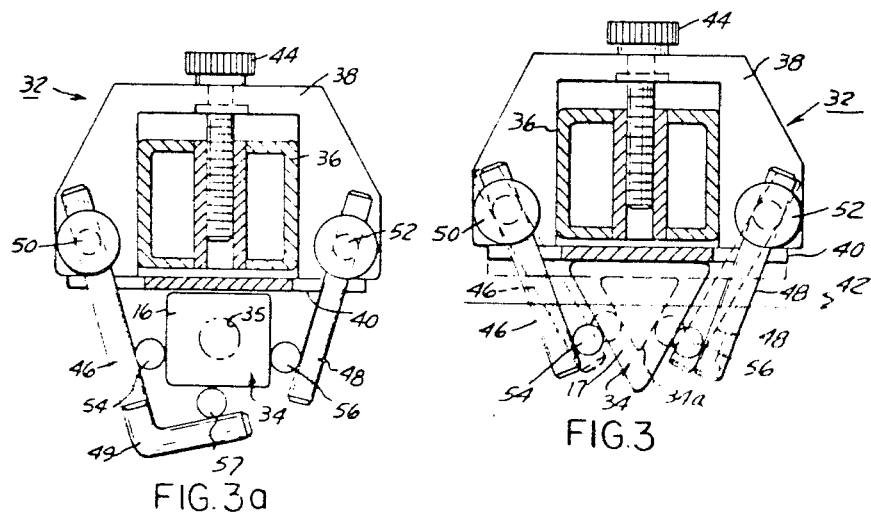
FIGS. 3 and 3a are transverse cross sections through the universal blank loading magazine associated with each grinding unit.

The universal automatic magazine 32 (one of which is shown in detail in cross section in FIGS. 3 and 3a) provides a fast changeover from one polygonal shape to another or from one size insert to another. For example, as seen in FIG. 3, triangular inserts 17 of different sizes may be accommodated. The magazine comprises a column 36 which is fixed to the grinding unit 28 and which is surrounded by a slide 38. Part of the slide 38 is covered by a plate 40 adapted to laterally support the insert blanks 34. The slide 38 is transversely movable in relation to the column 36 so as to move the support plate 40 towards or away from the column 36 in order to align workpieces of different sizes to the axis 42 of the gripping and transfer tool as will be explained hereinafter. Movement of the slide 38 transversely of the column 36 is accomplished by means of a screw adjustment 44. The workpieces or blanks 34 are retained against the lateral support plate 40 by means of opposite spring loaded fingers 46 and 48 which are pivoted at 50 and 52 respectively to the slide 38 adjacent opposite sides of the column 36. The front end of the pivot fingers 46, 48 are attached as by welding or brazing to vertical rods 54 and 56 respectively to retain a sufficiently large number of workpiece blanks placed one upon another. As shown in FIG. 3 in solid lines the fingers 46, 48 retain a triangular shaped insert blank 34 of a certain size. In order to retain insert blanks 34a of smaller size indicated in dot and dash lines the fingers 46, 48, due to their pivotal arrangement, swing inwardly towards each other in order to embrace the smaller size blanks as also indicated in dot and dash lines. After insertion of the blanks 34a between the rods 54, 56, the screw adjustment 44 is manipulated to move the support plate away from column 36 a distance sufficient to align the center of the smaller blank 34a with the axis 42 of the gripping tool, to be described later on. FIG. 3a illustrates the magazine accommodation of blanks for square shaped inserts 16. In this instance, due to the sides of the blanks being normal to the plane of the vertical support plate 40, an additional finger support 49 and rod 57 must be provided for the front side of the blank to retain it against the plate 40. This additional finger 49 may be attached to either pivot 50 or 52 as shown for pivoting and adjusting movement in accordance with the size of the square blank. It will be obvious that this unique universal magazine arrangement accommodates any polygonal shape of workpiece blanks such as shown in FIGS. 1a to 1d, and the like.

Figure 4:
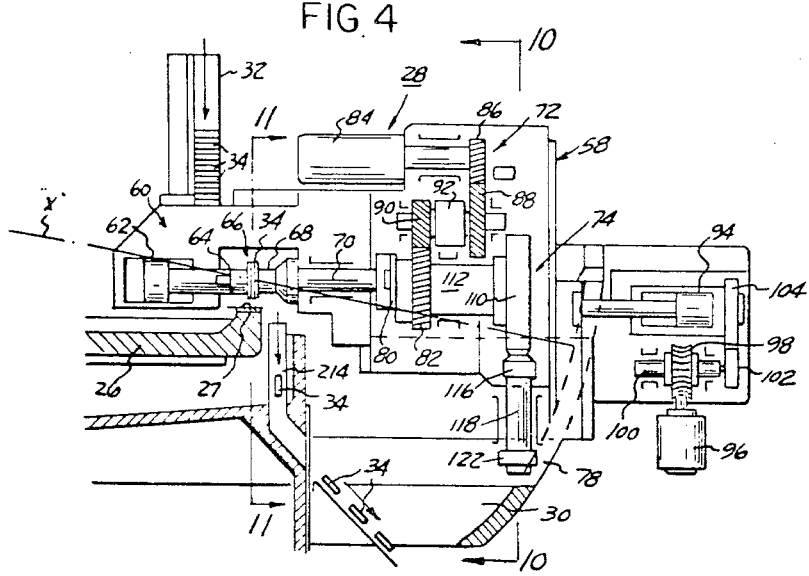
FIG. 4 is a longitudinal schematic section through one grinding unit schematically illustrating the work spindle, master cam and angular adjustment driving mechanism not necessarily drawn to scale.
Figure 5:
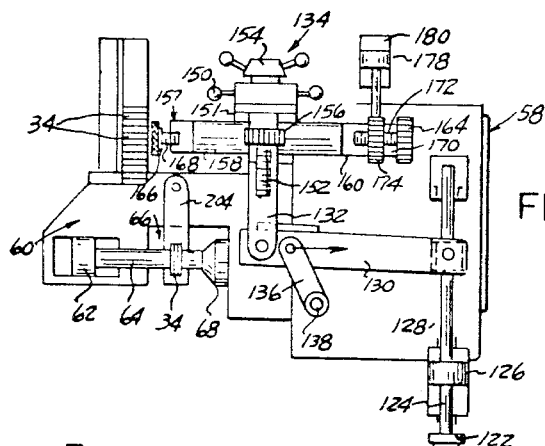
FIG. 5 is a partial schematic view of the control mechanism of one of the grinding units with radius adjustment not necessarily drawn to scale.

The work stations or grinding units 28, 28a and 28b are identical with each other so that it will suffice to describe only one of them. As schematically illustrated in FIGS. 4 and 5, the grinding unit 28 comprises a housing 58, a front 60 of which extends above and within the confines of the grinding wheel 26 and contains a fluid pressure actuated piston 62 adapted to reciprocate a work holding tool 64 extending within the work area 66 of the housing 58. Arranged coaxial with the work holder 64 and opposite thereof is a complimentary work holding tool 68 integral with a rotatable spindle 70 which is rotated by a reduction gear mechanism generally indicated at 72 in conjunction with a master cam drive mechanism generally indicated at 74. Both of these units 72 an 74 will be described in detail hereafter.

Figure 9:
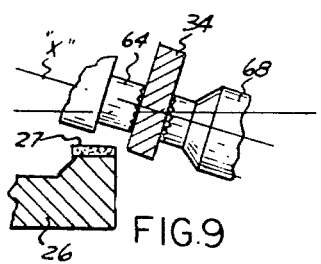
FIG. 9 is an illustration of the workpiece and workholders during a rake angle grinding operation.

The front part 60 of the work station housing 58 is vertically adjustable by means of slides 59, as seen in FIG. 2a, in relation to the horizontal plane of the grinding wheel 26 necessitated by the polygonal shape of the workpieces if they are to be ground all around their edge surfaces. This vertical movement of the housing part 60 is controlled in indexed sequence by the master cam drive mechanism 74. In addition, the entire work station housing 58 is horizontally reciprocable as by slides 61 (FIG. 6) along a limited distance towards and away from the center of the grinding wheel 26 in order to position the workpiece 34 on the grinding surface 27 from the initial receiving position outside of the grinding wheel 26, as will be explained hereinafter and to provide reciprocatory motion across the face of the grinding wheel during plunge type grinding operation. The work station housing 58 is further vertically angularly adjustable by means of arbors 76 which support the housing in curved slots 78 in the housing support brackets 30 (FIG. 2). The slots 78 are curved on a radius having the mid point of the grinding surface 27 as its center so that upon angular repositioning of the work station housing 58 in relation to the horizontal grinding wheel 26 the sides or corners of the workpieces 34 as illustrated in FIGS. 4 and 9 will be presented to the grinding surface 27 at an angular axis X in relation to the horizontal plane of the grinding wheel in order to grind the desired negative or positive rake angles for the cutting tool bits. In most cases an extent of from 20 to 25 angular degrees of adjustment will be sufficient to grind the most common tool bit rake angles.

In order to facilitate driving of the work spindle 70 and to compensate for the vertical repositioning of the work area housing part 60 during the grinding cycle, as indexed by the master cam mechanism 74, the workpiece spindle 70 is connected to the gear drive 72 by means of a universal joint 80 to allow angular disposition of the spindle 70 in relation to the fixed axis of the drive gear 82.

It will be understood from the foregoing, that a workpiece 34 placed between the opposite work holders 64 and 68 from the magazine 32 will be securely clamped between them by means of fluid pressure actuation of piston 72 accommodating various plate widths of the workpieces 34. In case the workpieces 34 are provided with an aperture 35 as indicated in broken lines in FIGS. 1a to 1d and in FIG. 7, the work holder 64 is provided with a spring loaded arbor 65 adapted to extend into the aperture 35 of the blank. Although this aids in positioning and centering the workpiece blank in relation to the grinding wheel, it is not a necessary requirement. The workpieces can be solid in which case the spring loaded arbor 65 would be simply forced inside the work holder 64 when displaced by piston 62 against the workpiece which will then be securely clamped in centered position by means of fluid pressure on piston 62.

The work spindle 70, as already mentioned, is rotated by the gear drive 72 which is a reduction gear drive in accordance with the ratio between the master cam and the workpiece blank. The spindle gear drive 72 is driven by an electric motor 84 through input gear 86 and transfer gears 88 and 90 out to the drive gear 82. The transfer gears 88 and 90 are drivingly connected by a clutch 92 which may be of a magnet type for quick disconnect of the work spindle during rotational repositioning of the workpiece by the indexing cam mechanism 74.

Horizontal reciprocation of the work station housing 58 for linear infeed and plunge grinding of the workpiece is accomplished by means of a fluid pressure actuated piston 94 which upon timed actuation advances or returns the entire work station housing 58 by means of antifriction slides 61 (FIG. 6) and thus positions the work area 66 in proper relation to the grinding wheel 26 for 1) receiving a workpiece in the return position, 2) grinding the workpiece in a forward position, and 3) releasing the workpiece in the return position.

Oscillating movement of the work station housing 58 to obtain an optimum in surface quality and dimensional accuracy is achieved by an electric motor driving a worm gearing 98 whose cross shaft 100 carries an eccentric 102 which engages another eccentric wheel 104 associated with the piston housing 106 of the linear infeed piston 94. Thus, upon actuation of the motor 96, an oscillatory movement is being transmitted to the work station housing through the eccentrics 102 and 104. The oscillating range and frequency is relatively small but sufficient to obtain a fine finish on the workpieces as they oscillate across the grinding surface 27.

Figures 14, 15:
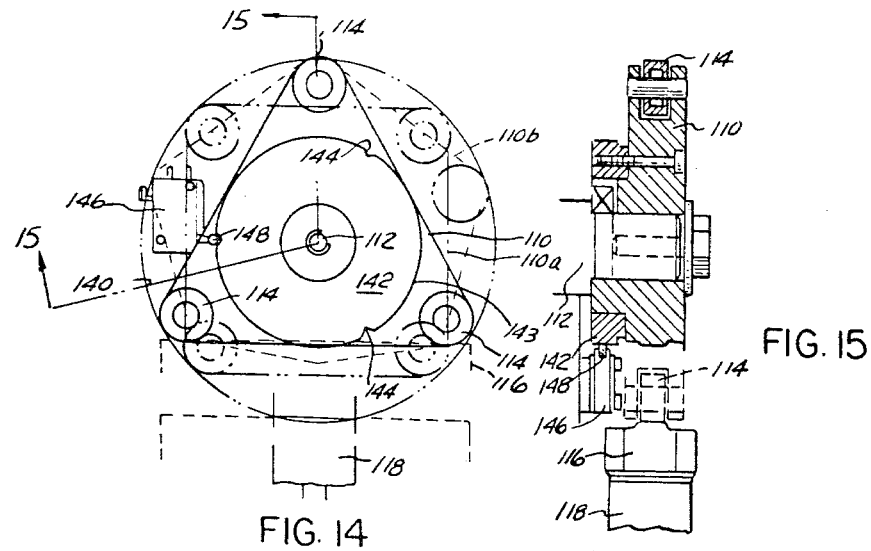
FIG. 14 is an enlarged schematic view of the various shapes of master index cam assemblies inscribed within the same roll circle diameter.
FIG. 15 is a cross section through FIG. 14 along line 15—15.
Figure 13:
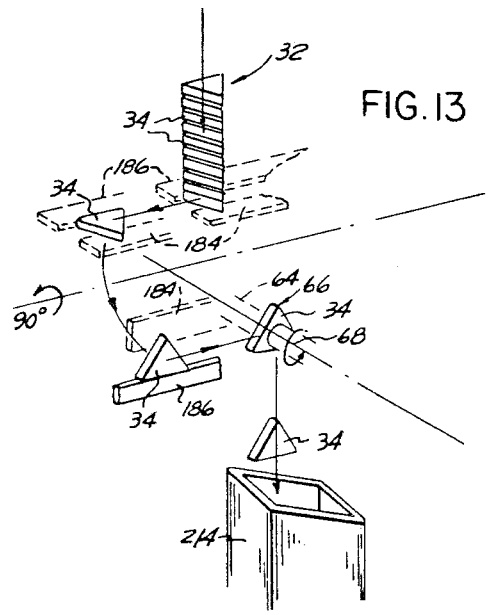
FIG. 13 schematically illustrates the gripping, rotation and transfer method of the workpiece from the bottom of the magazine to the grinding area.
Figure 16:
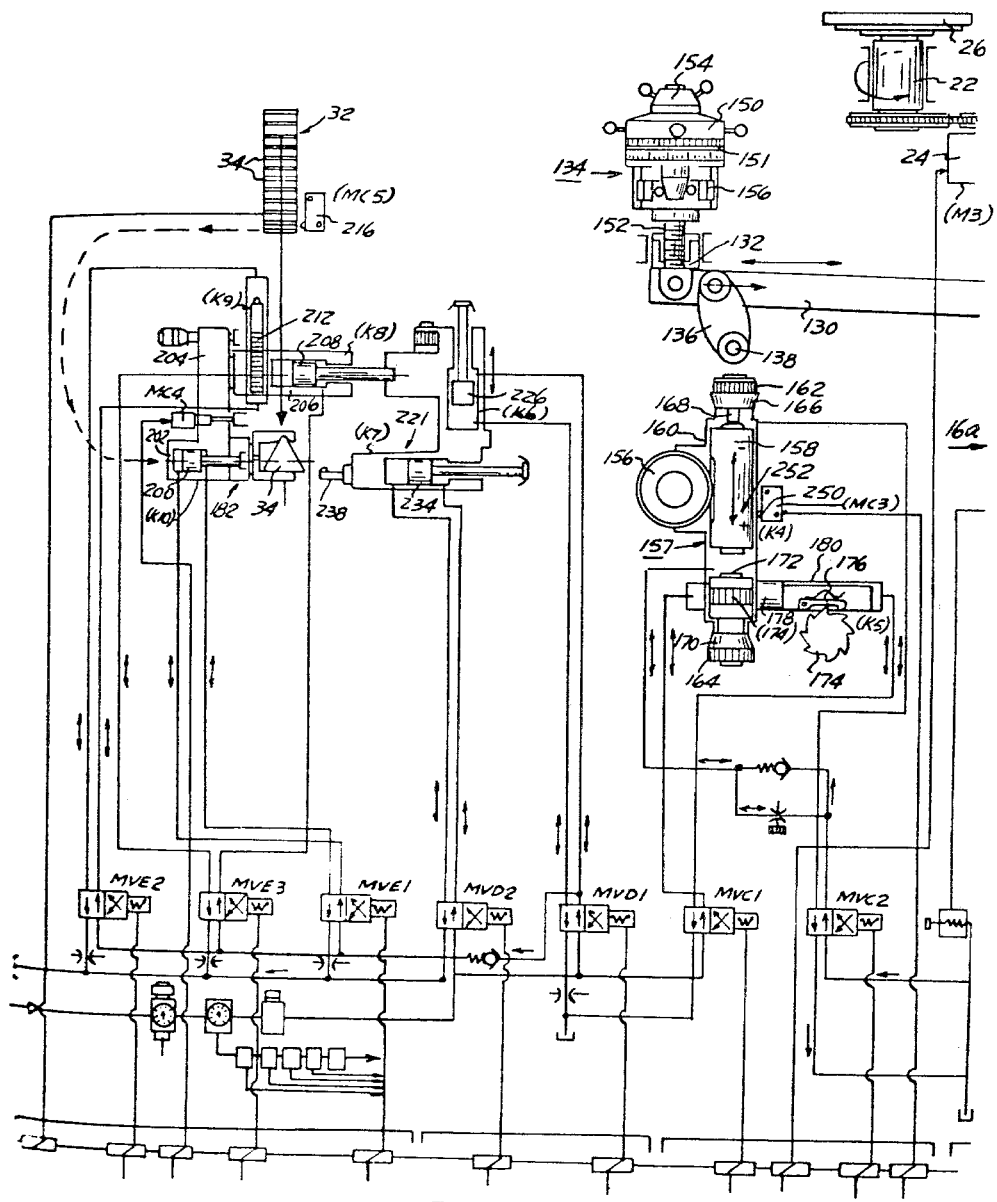
FIG. 16 and FIG. 16a are schematic diagrams of the electric and fluid pressure control system illustrating the working cycle of the machine.
Figure 16A:
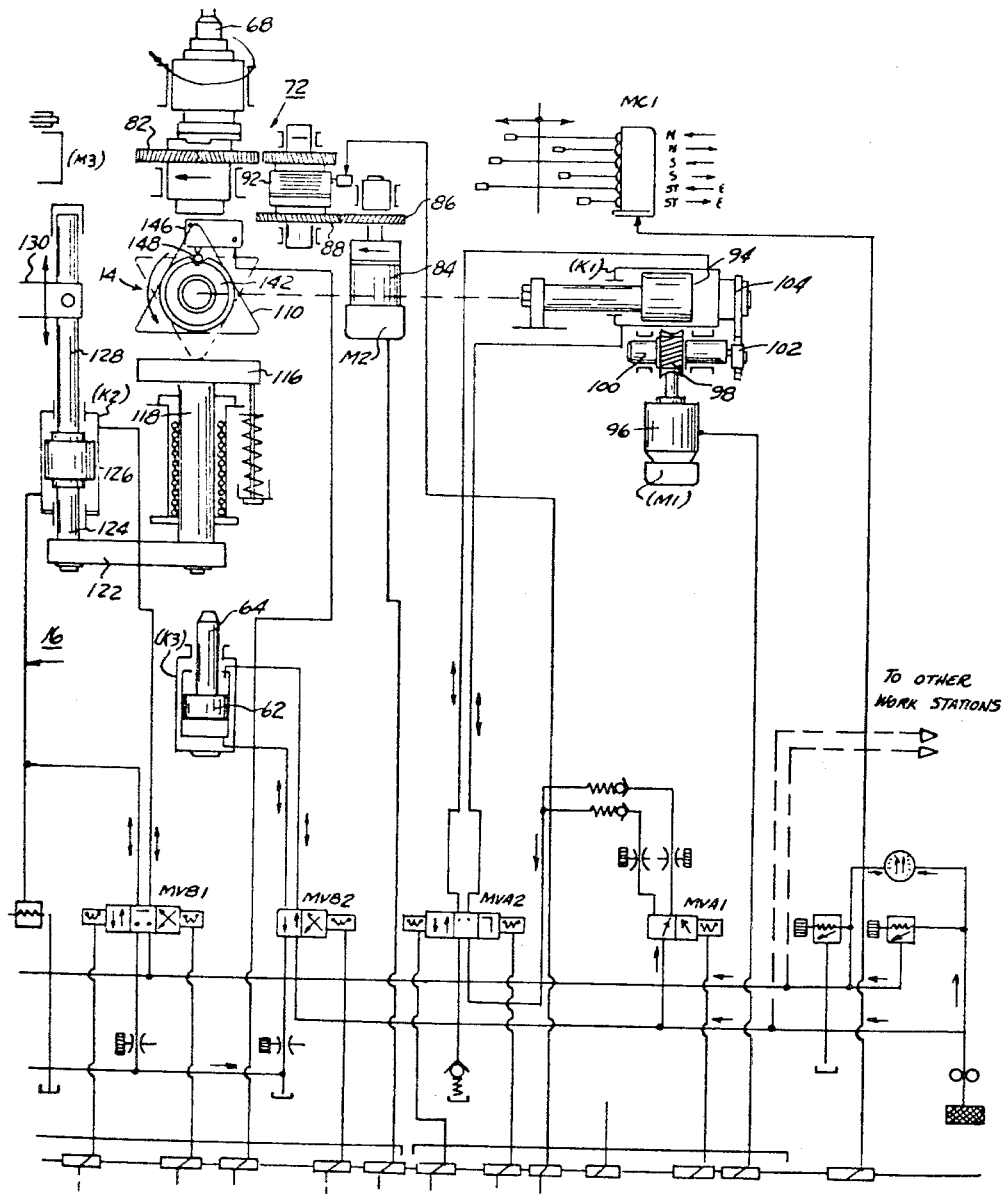

In order to successfully grind the sides 106 and apexes 108 of, for instance, a triangular workpiece such as cutting insert 16 of FIG. 1b which, for example, is shown in the drawings as being processed, a master cam mechanism 74 is provided which in conjunction with the reduction gear drive 72 and work spindle 70 vertically positions the housing front part 60 in relation to the grinding wheel as the workpiece is being rotated in response to the timed rotation of a master cam 110. The master cam 110, which in this instance and as shown in FIGS. 10 and 14 is of triangular shape to correspond to the triangular shape of the workpiece shown by example, is secured to a shaft 112 whose other end receives the spindle drive gear 82. As seen in FIGS. 10 and 14 the three apexes of the master cam 110 are provided with rollers 114 in order to facilitate rotational movement of the master cam across a cam follower plate 116 which is vertically displaceable upon rotation of the master cam. As illustrated in FIG. 10, the cam follower plate 116 is secured at one end to a vertical stud or shaft 118 reciprocable within a linear ball bearing assembly 120. The other end of the shaft 118 is secured to a link 122 which is connected to a piston rod 124 of a double acting fluid pressure piston 126. The piston 126 is provided on its other face with a rod 128 which extends upwardly through housing 58 and, as illustrated in FIGS. 5 and 16, is pivotally connected to an adjustable lever 130. The lever 130 provides a means by which the movable housing part 60 is successfully raised or lowered to present the diverse sides and apexes of the workpiece to the grinding surface 27 as indexed by the master cam 110. To this end, the opposite end of the lever 130 is connected to an adjusting rod 132 which is secured within the housing front part 60. The adjusting rod 132 is associated with a micro scale adjusting mechanism 134 which by manual adjustment, as will be described, changes the vertical position of the lever 130 by means of a connecting link 136 which is connected to the lever 130 at a point some distance removed from the lever attachment to the adjusting rod 132. The other end of connecting link 136 is pivoted at 138 within the housing 58. Thus, upon reciprocating movement of the piston rod 128 as caused by rotation of the master cam 110 acting on follower plate 116 the lever 130 will be displaced, pivoting on the connecting link 136 and thus displacing housing part 60 and with it the work spindle 70 in relation to the grinding wheel surface 27 in timed sequence to present all sides and apexes of the workpiece to the grinding surface in succession. The leverage ratio can be adjusted by means of the micro scale adjusting mechanism 134 to accommodate different sizes of workpieces without the necessity of having to interchange the master cam 110. Thus, only one size master cam will be necessary for any size workpiece of a certain polygonal shape. Of course, the polygonal shape of the master cam must always correspond to the polygonal shape of the workpiece being worked on and, as seen in FIG. 14, a square shaped master cam 110a may be substituted for the triangular master cam when grinding square shaped inserts 16 as seen in FIG. 1a, or a pentagonal master cam 110b may be substituted to accommodate pentagonal workpieces 14 as seen in FIG. 1d. It will be noted in FIG. 14 that the imaginary roll circle 140 of either master cam is the same, so that no alteration need to be made in regard to the relative position between the master cam shaft 112 and follower plate 116 when changing from one master cam setup to another.

As mentioned before, the workpiece 34 is being rotated in timed sequence as caused by the indexing rotation of the master cam 110. This is accomplished by the provision of a notched index plate 142 attached to the face of the master cam 110 on the same shaft center 112. The circumference of the index plate 142 is provided with equiangularly spaced notches 144 corresponding in number to the number of sides of the identically shaped master cam and workpiece. Thus, the index plate of a triangular master cam has three notches, with a square shaped master cam it would have four notches, with a pentagonal shaped master cam five notches and so on. The notches 144 on index plate 142 are provided to trigger a micro switch 146 whose contact roller 148 abuts against the circumference 143 of the index plate 142 and, upon step by step rotary movement of the master cam, is being triggered to disengage the magnetic clutch 92 to stop the work spindle drive when the master cam is being rotated to reposition the workpiece and to engage the clutch 92 again to resume rotation of the work spindle upon finishing of the reposition sequence. This will be more clearly explained by the description of the operation of the machine in connection with the control diagram of FIG. 16.

Micro scale adjustment of the leverage of lever 130 to accommodate different sizes of workpieces is accomplished by manipulating the micro scale adjustment mechanism 134. For this purpose, a hand wheel 150 is provided to rotate a screw 152 which acts on the lever adjusting rod 132. The circumference of the hub 151 of the hand wheel 150 is provided with a micro scale as indicated in FIG. 16 to allow accurate fine adjustment of the lever 130 corresponding to any particular size workpiece. The adjustment is then locked in place by the coaxial lock wheel 154. As seen in FIGS. 5 and 16, the adjusting screw 152 associated with the adjusting rod 132 carries a gear 156 which engages a free piston 158 positioned normal to the axis of the adjusting screw within a cylindrical housing 160. One end of the cylindrical housing 160 is provided with a first micro scale adjustment 162 and the other end of the housing is provided with an opposite, second micro scale adjustment 164.

The first micro scale adjustment 162 is provided with a radial micro scale 166 (FIG. 16) and an axial abutment stop 168 extending within the cylinder housing 160 adapted to stop movement of the piston 158 in one direction. The opposite, second micro scale adjustment 164 is likewise provided with a micro scale 170 and an abutment stop 172 extending within the cylinder housing 160 from the other end adapted to limit movement of the free piston 158 in the other direction. Thus, by manipulating the micro scale adjustments 162 and 164 to move the limit stops 168 and/or 172 in or out of the cylinder housing 160 the free movement of the piston 158 will be accordingly limited. Initial positioning of the free piston 158 is done by manipulating of the hand wheel 150 of the micro scale adjustment mechanism 134. The limit stop 172 of the second micro scale adjustment 164 is provided with a ratchet 174 adapted to be engaged by a pawl 176 which is integral with a compensating piston 178 moving in a cylinder 180 positioned normal to the axis of the cylinder housing 160. This arrangement provides additional compensation to properly position the workpiece upon wear of the grinding wheel surface 27, as will be explained. The maximum movement of the free piston 158 determines the full selected adjustment of the central axis of the workpiece 34 in relation to the surface 27 of the grinding wheel 26.

Figure 12:
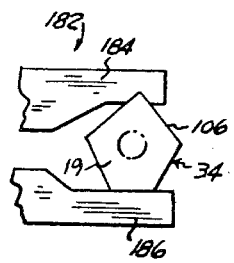
FIG. 12 illustrates the gripping and transfer tool holding a workpiece of different polygonal shape than that shown in FIG. 11.

Transfer of the workpiece 34 from the magazine 32 is accomplished in the following manner: With reference to FIGS. 4, 11, 12 and 13, a gripping tool 182 is being provided which comprises opposite jaws 184 and 186 respectively, pivoted at their rear ends at 188 and 190 to a bracket 192. The rear extensions 194 and 196 respectively of the gripping jaws 184, 186 engage with a piston rod 198 of a piston 200 reciprocating within the cylindrical extension 202 of the bracket 192. The structure of the jaws 184, 186 is such as to selectively accommodate diverse polygonal shapes of the workpiece 34, as illustrated in FIG. 12. It will be seen that upon reciprocation of the piston 200 due to its engagement with the rear extensions of the jaws, the jaws 184, 186 will be selectively closed to grip a workpiece or opened to release the workpiece.

In order to position the workpiece 34 from its horizontal magazine feed position to its vertical position within the work area 66 to be gripped between the work holders 64 and 68, the gripping tool 182 is secured to a member 204 which is associated with a cylinder 206 enclosing a piston 208 by means of which the member 204 and thus the gripping tool 182 may be reciprocated towards and away in regard to the work area 66. The reciprocating cylinder 206 is provided with splines or teeth 210 adapted to be engaged by a second piston 212 positioned normal to the axis of the reciprocating cylinder 206 so that upon actuation of piston 212 the cylinder 206 will be rotated to swing member 204 and thus the gripping tool 182 around through an arc of 90° in timed sequence. With specific reference to FIG. 13, the sequence of positioning of the workpiece 34 within the work area 66 from the magazine 32 is as follows: The gripping tool 182, in horizontal position, advances to grip the workpiece 34 from the bottom of the magazine, then recedes by actuation of the piston 208 and is swung through an arc of 90° by actuation of the piston 213 to bring the workpiece 34 in line with the work area 66 in vertical position for grinding. The gripping tool 182 then advances by renewed actuation of piston 208 to position the workpiece in the center of the work area 66 to be gripped and clamped by the opposite workholders 64, 68 after which the gripping tool 182 releases by actuation of the gripping jaw piston 200 and then returns to its original horizontal position in front of the magazine for gripping and transporting another workpiece in timed sequence after the first workpiece has been finish ground and released by the work holder to be dropped in the collection chute 214.

As schematically illustrated in FIG. 16, the bottom of the magazine 32 is provided with a sensing device such as a light beam in conjunction with a photo cell or the like (not shown) connected to a micro switch 216 which is normally held open as long as the light beam is interrupted by the presence of a workpiece in the magazine but which will close when the light beam contacts the photo cell due to the absence of any workpiece in the magazine thus establishing electrical contact to close switch 216 to light up a signal light 218 at the master control panel 220 (FIG. 17) signalling to the operator that the magazine is empty.

Figure 11:
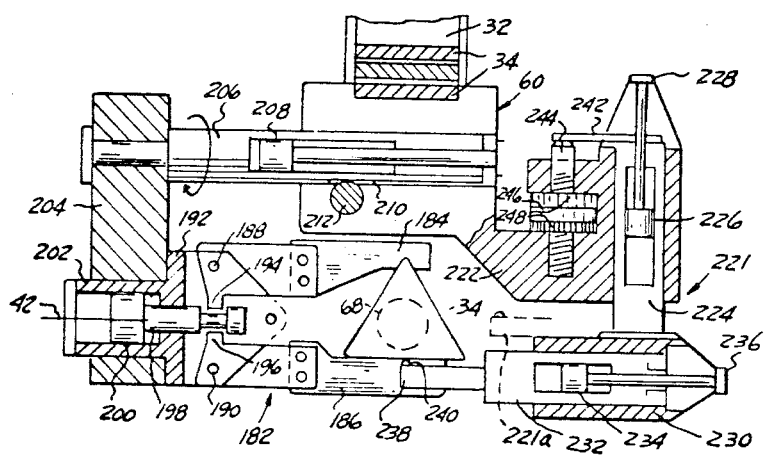
FIG. 11 is another section through FIG. 4 along line 11—11 schematically illustrating the work holding and dimension checking mechanism in more detail likewise not necessarily drawn to scale.

Automatic provisions are made to periodically check the finish ground surfaces of the workpieces 34 for accuracy and this is accomplished by a gaging assembly 221 comprising a housing 222 which is attached to the side of the work station front housing part 60 opposite from the gripping tool 182. The housing 22 encloses a first cylinder 224 movable within the housing in vertical direction by means of a stationary piston 226 within the cylinder which is secured to the housing at 228. The movable vertical cylinder 224 carries a tube 230 at its lower end thereof which extends horizontally therefrom thereon and in normal direction to the vertical axis of the vertical cylinder 224. The tube 230 encloses a second movable cylinder 232 which is actuated for movement by means of a stationary piston 234 within the cylinder which is secured rearwardly at 236 to the tube 230. The second horizontal cylinder 232 carries a gage 238 provided with a feeler 240 which is adapted, as seen in FIG. 11, to move along the ground surface edges of the workpiece 34 upon actuation of the cylinder 232 to check their accuracy, as will be explained. Normally, the gaging assembly 221 is moved out of the way away from the work area 66 by means of reverse actuation of the cylinders 224 and 232 to a position shown at 221a in FIG. 11. Downward movement of the vertical cylinder 224 to bring the gage 238 in position relative to the workpiece 34 is adjustably limited by a stop 242 abutting against a pin 244 within the housing 222 which is vertically adjustable by means of a round nut 246 having a micro scale 248 inscribed hereon for accurate adjustment of the downward movement of the cylinder 224 in relation to the certain size and shape of workpiece to be measured. As mentioned before, accuracy measurement of the ground surfaces is made only periodically during any production run as, for instance, after every 40 or 50 workpieces. The down stop 242 is adjusted in advance before starting the machine corresponding to the size and shape of the workpiece to be machined. By initiation of the gaging cycle, which will be programmed prior to operation of the machine, the gage cylinders 224 and 232 are actuated in succession to bring the gage feeler 240 in contact with the ground surface of the workpiece 34 held between the work holders 64, 68 as illustrated in FIG. 11. The workpiece 34, which has been moved away from the grinding wheel 26 by reverse movement of the work station housing 58, is continuously slowly rotated by cam indexed rotation of the work holders 64, 68 to bring all surfaces in contact with the feeler 240 of the gage 238. After all ground surfaces have been checked the gage assembly 221 returns to its out of the way position at 221a and, if the workpiece checks out correctly, the work holder 64 reverses to release the workpiece which then drops into the chute 214. If the workpiece does not check out, a signal from the gage assembly causes actuation of the compensating piston 178 (FIGS. 5 and 16) which by movement with its pawl 176 turns the ratched 174 on the adjustable limit stop 172 in the compensation unit 157 to advance the stop 172 a certain distance and thus further limits the movement of the free piston 158 in addition to the manual adjustment made prior to the operation of the machine. Thus, wear or out of balance condition of the grinding wheel 26 is being automatically compensated for.

Figures 7, 8:
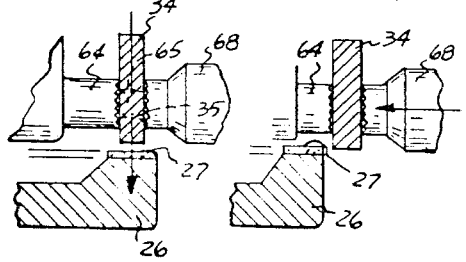
FIG. 7 is an illustration of the movement during a rotary grinding operation.
FIG. 8 is an illustration of a plunge grinding operation.

The present novel profile grinding machine can be programmed for plunge grinding in which the workpiece is fed in linear direction across the grinding surface 27 with following oscillating grinding for the radii of the apexes between the sides of the workpiece. This operation is illustrated in FIG. 8 in which the reciprocating movement of the workpiece 34 across the grinding surface 27 is indicated by the direction of the arrow. The machine can also be programmed for direct rotary grinding in which the workpiece is sequentially rotated across the grinding surface 27 as dictated by the indexing cam mechanism without linear infeed movement. This operation is illustrated in FIG. 7 with the workpiece moving in the direction of the arrow as shown. Both of these operations can be performed with the workpiece axis positioned at a negative or positive angle X in relation to the plane of the grinding surface 27, as illustrated in FIG. 9, in order to grind the desired rake angle for the tool bit or insert. Angular positioning of the work axis as previously mentioned is accomplished by moving the work station housing 58 within the curved slots 78.

Figure 17:
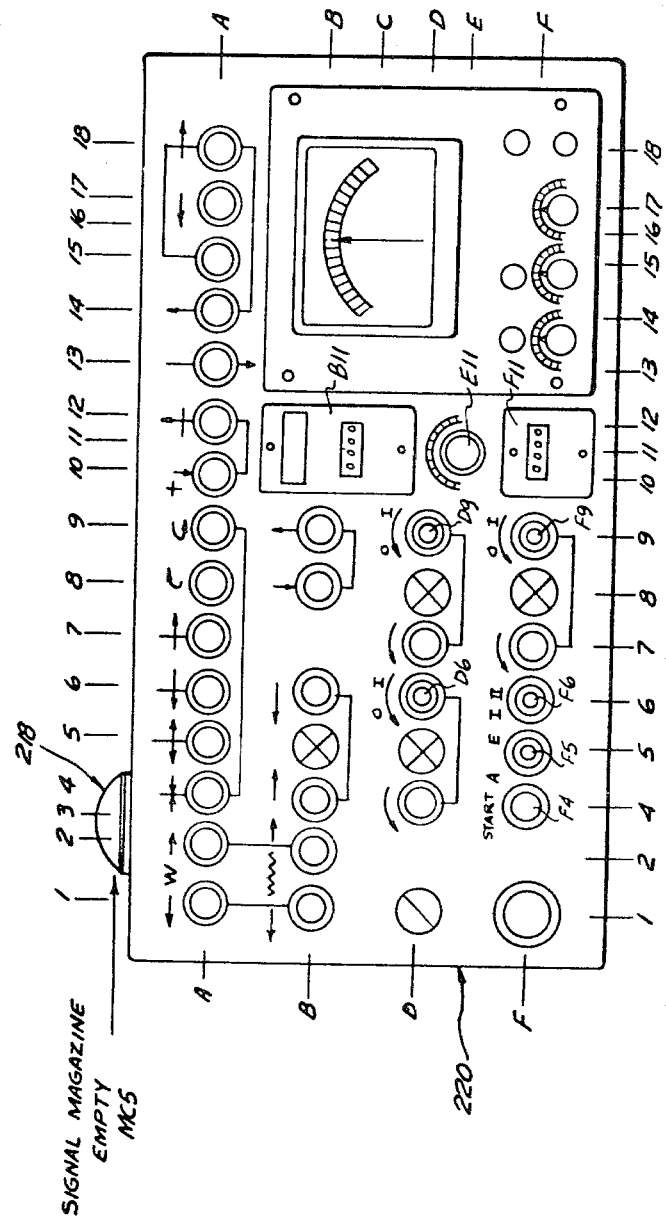
FIG. 17 is a detail front view of the master control panel for operation of the machine.

With particular reference to FIGS. 16–18 the operational cycles of the machine are as follows: After initial adjustments have been made at the micro scale adjustment 134, compensation unit 157 and gaging assembly 221 in correspondence with the size and shape of the workpiece to be machined, the grinding wheel motor 24 (M3), work spindle motor 84 (M2) and the motors for the hydraulic pumps and coolant (not shown) are started. The pre-selection counter B11 in FIG. 17 is set for the desired check number of pieces and on a starting basis "zero" and the total counter F11 is set on "zero".

I. Plunge Grinding Operation

Switch D6 and F9 are being put on "0"; switch D9 on "in"; switch F5 on "automatic"; switch F6 on "Program I"; depression of switch F4 starts the machine. Thereupon, the gripping tool cylinder 202 (K10) is being actuated through valve MVE1 to grip a workpiece 34 and in sequence piston 208 (K8) of the swing arm 204 is being actuated over valve MVE3 to move outwardly as indicated by the arrows and, in conjunction with piston 212 (K9) actuated through valve MVE2, swings the member 204 downwardly, as indicated by the arrows, whereafter the piston 208 (K8) over valve MVE3 moves the assembly back to position the workpiece 34 within the work area 66. Upon complete return of the gripping tool assembly a micro switch MC4 is being triggered which causes piston 200 of the gripping tool cylinder to move back and thereby open the jaws 184, 186 to release the workpiece 34 after piston 62 of the work holder 64 has moved forward as actuated through valve MVB2 to clamp the workpiece between the work holders 64 and 68. Then the piston 208 (K8) actuated through valve MVE3 moves the gripping tool assembly again outwardly and piston 212 (K9) actuated by valve MVE2 rotates the assembly in the reverse direction whereupon piston 208 (K8) moves inwardly again to allow the gripping tool 182 to grip another workpiece 34 from the magazine 32 upon actuation of tool cylinder 202 (K10) through valve MVE1. Hereafter piston 126 (K2) is moved upward through actuation by valve MVB1 to move the cam follower plate 116 into engagement with one side of the master cam 110. In the correct initial start position of the master cam 110 the micro switch 146 (MC2) is triggered through engagement of its contact roller 148 with a notch 144 in the index plate 142 which causes actuation of the piston 94 (K1) through valve MVA1 to move the work station housing 58 quickly forwardly to position the workpiece 34 over the grinding surface 27 whereafter the micro switch MC1 is triggered to reciprocate piston 94 (K1) through valves MVA1, MVA2 for ormal plunge grinding of one side 106 of the workpiece. Timed micro switch MC1 goes to "stop" position and then causes return of the work station piston 94 (K1) over valve MVA2 to remove the workpiece 34 from the grinding wheel. Thereafter, or simultaneously, the oscillating motor 96 (M1) is started through timer switch E11 in FIG. 17. Piston 126 (K2) is returned through valve MVB1 to move follower plate 116 away from the master cam 110. Through actuation of the magnet coupling 92 (MAC) the master cam 110 and workpiece 34 are rotated in unison to present an adjacent apex 108 of the workpiece to the grinding wheel surface 27. Through timed micro switch MC1 the work station piston 94 (K1) is again actuated to move the station forward to bring with workpiece in engagement with the grinding surface 27 whereupon the already started oscillating motor 96 (M1) causes the apex of the workpiece to be oscillated around the rotary grinding surface 27 to grind the required radius. Again the time micro switch MC1 goes to "Stop" and then causes piston 94 (K1) to return housing 58. Simultaneously, the timer switch E11 runs out to stop oscillating motor 96 (M1) and again reactivating magnet coupling 92 (MAC) the workpiece 34 and master cam 110 are rotated in unison to present another side 106 to the grinding surface 27. The piston 126 (K2) again starts moving upwardly through actuation by the valve MVB1 to bring the follower plate 116 again in contact with master cam 110. In proper starting position of the master cam 110 the micro switch 146 (MC2) is triggered to cause actuation of piston 94 (K1) to move housing 58 quickly forward again to bring the workpiece in contact with the grinding surface 27 whereafter again timed micro switch MC1 takes over to reciprocate the workpiece over the grinding surface 27 for another plunge grinding operation. The foregoing work cycle is repeated until the index plate 142 associated with the master cam 110 has rotated through a full 360° whereupon a suitable switch (not shown) signals the end of the grinding operation for this workpiece and timed micro switch MC1 causes piston 94 (K1) to return housing 58, whereupon the work holder piston 62 moves back as actuated through valve MVB2 to release the finish ground workpiece which then falls into the discharge chute 214.

Normally the free piston 158 (K4) in the compensation unit remains inactive in its position as adjusted prior to starting the machine. However, when the preselection counter B11, which is set for a certain number of workpieces in this case of from 20 to 50, has run out after finish grinding of the last counted workpiece valve MVC2 is opened to move piston 158 (K4) in opposite direction for maximum compensation, by which micro switch MC3 is triggered through engagement of its contact 250 with a notch 252 in the piston 158 (K4) which causes actuation of the piston 226 (K6) of the gage assembly 221 through valve MVD1 to move the cylinder 224 downwardly and piston 234 (K7) is moved forwardly as actuated by valve MVD2 to bring the gage feeler in contact with the ground surface of the workpiece 34 as described previously. Upon measuring any inaccuracy, a signal from the gage 238 causes actuation of the compensation piston 178 (K5) through valve MVC1 to advance limit stop 172 as likewise previously described. This provides a correction in the machine setup through the lever adjusting mechanism 134 for the next workpieces to be ground to compensate for wear of the grinding surface 27.

II. Direct Rotary Grinding Operation

For programming of a rotary grinding operation, the same initial steps of micro scale adjustments, starting of the various motors and setting of the counters B11 for gaging and F11 for total number, are made as for the plunge grinding operation. Thereafter, switches D6 and F9 are set on "zero", switch D9 on "in", switch F5 on "automatic" and switch F6 on "program II". Actuation of switch F4 starts the machine. The magazine and work transfer cycle is the same as for "program I" and does not need to be repeated.

Compensating piston 178 (K4) is in its initial adjusted position. Piston 94 (K1) is actuated through valves MVA1 and MVA2 to move forward to position the workpiece 34 on the grinding surface 27. The magnet coupling 92 engages and rotates the workpiece 34 across the grinding surface 27 by means of the drive mechanism 82, 86, 88 and 90. All other operations including the gaging and compensation are similar to the operations described in connection with "program I". In any instance, when the master cam 110 is being rotated for indexing, the magnet clutch 92 disengages the work spindle drive from the cam drive.

FIG. 18 is a graphic representation of the various groups of controls and their interrelated functions in the operation of the machine.

IN CONCLUSION

The present automatic profile grinder provides novel features which makes fully automatic contour grinding of polygonal cutting tool inserts possible. This includes grinding of cutting edges at desired rake angles and grinding of the apex radii in one cycle by the use of a master cam assembly of such structure as to enable the use of the same master cam for any size of inserts of a given polygonal shape, eliminating the necessity of a complicated master cam changeover and readjustment of the machine when changing from one size workpiece to another.

Due to the horizontal position of the grinding wheel several individual grinding units may be positioned therearound, which greatly increases the efficiency of the machine. This also makes it possible to simultaneously grind as many polygonal shapes or sizes of workpieces as there are grinding units grouped around the wheel.

Likewise, different contours such as different rake angles for workpieces of identical polygonal shapes can be ground simultaneously due to the provision of multiple grinding stations.

With the combination of vertical, horizontal and angular movement of the grinding station in relation to the grinding wheel either method of plunge grinding or rotary grinding or a combination of both can be used.

Novel features are also provided to gage the workpiece in the machine and to automatically compensate for grinding wheel wear by readjustment of the original machine setup. The micro scale adjusted machine setup is such as hold the allowable dimensional tolerances on the workpieces to close limits. In addition a novel feed magazine and work transfer mechanism is provided in which the magazine is of such universal construction as to accommodate any size and shape of polygonal workpieces.

The present invention may be embodied in certain other forms without departing from the spirit and essential characteristics thereof, therefore, the present embodiment is considered in all respects as illustrative only and not restrictive, the scope of the invention being indicated by the appended claims rather than by the foregoing description.

We claim:

1. A method for performing successive grinding operations upon a polygonal workpiece consisting of the steps of providing a magazine of identical workpieces, removing a single workpiece from the magazine, transporting said workpiece to a work area, holding said workpiece in a predetermined position, advancing and lowering said workpiece into contact with a grinding tool, rotating said grinding tool, thereafter rotating said workpiece from said predetermined position to a plurality of successive predetermined positions while in said work area in timed sequence to permit grinding of additional areas comprising the sides and apexes of said polygonal workpiece and removing said finish ground workpiece from said work area and finally discharging same from said holding means.

2. The method defined in claim 1, including the further steps of retaining said finish ground workpiece within said work area and measuring said finish ground workpiece prior to removal of the workpiece from said work area and discharging a measured completely finish ground workpiece from said work retaining means.

3. The method as defined in claim 2 further including the step of sensing measurement variations in the finish ground workpiece and advancing and lowering successive workpieces into contact with said grinding tool to compensate for variations sensed in said measurement step.

4. A method for performing successive grinding operations upon the peripheral sides and corners of a polygonal workpiece blank comprising the steps of gripping a workpiece blank to remove same from a stack of said workpiece blanks, rotating said workpiece blank and transporting same to a work area, holding said workpiece blank to present one of said peripheral sides to a grinding surface of a grinding wheel, rotating said grinding wheel to grind said side and thereafter rotating said blank while in said work area in timed sequence to successively grind all of said peripheral sides and said corners of said polygonal workpiece blank before said blank is released from said holding means.

5. The method defined in claim 1, wherein the workpiece after contact with said grinding tool is moved linearly across said grinding surface in the direction of the axis of said blank and thereafter oscillating said blank across said grinding surface.

* * * * *